(12) United States Patent
Lee et al.

(10) Patent No.: US 7,761,112 B2
(45) Date of Patent: Jul. 20, 2010

(54) POWER CONTROL METHOD FOR UPLINK IN MOBILE COMMUNICATION AND APPARATUS THEREOF

(75) Inventors: Yu-Ro Lee, Daejeon (KR); Een-Kee Hong, Yongin (KR); Dong-Cheol Kim, Suncheon (KR); Hyun-Joon Shin, Seoul (KR); Dong-Seung Kwon, Daejeon (KR)

(73) Assignees: Samsung Electronics Co., Ltd. (KR); Electronics and Telecommunications Research Institute (KR); KT Corporation (KR); SK Telecom Co., Ltd. (KR); Hanaro Telecom., Inc. (KR)

( * ) Notice: Subject to any disclaimer, the term of this patent is extended or adjusted under 35 U.S.C. 154(b) by 720 days.

(21) Appl. No.: 11/653,764

(22) Filed: Jan. 16, 2007

(65) Prior Publication Data

US 2007/0189047 A1    Aug. 16, 2007

(30) Foreign Application Priority Data

Jan. 13, 2006    (KR) ...................... 10-2006-0003972

(51) Int. Cl.
*H04B 7/00*    (2006.01)
*H04B 17/00*    (2006.01)

(52) U.S. Cl. .................................. 455/522; 455/67.11
(58) Field of Classification Search ........................ None
See application file for complete search history.

(56) References Cited

U.S. PATENT DOCUMENTS

| 6,341,224 | B1 * | 1/2002 | Dohi et al. ................... 455/522 |
| 6,347,231 | B1 * | 2/2002 | Miya ........................... 455/522 |
| 6,404,826 | B1 * | 6/2002 | Schmidl et al. ............. 375/340 |
| 6,571,104 | B1 * | 5/2003 | Nanda et al. ................. 455/522 |
| 6,628,924 | B1 * | 9/2003 | Miyamoto .................... 455/69 |
| 2002/0145968 | A1 | 10/2002 | Zhang et al. |
| 2004/0228283 | A1 * | 11/2004 | Naguib et al. ............... 370/252 |

OTHER PUBLICATIONS

Didem Kivanc, Guoqing Li and Hui Liu; "Computationally Efficient Bandwith Allocation and Power Control for OFDMA"; pp. 1150-1158; IEEE Transactions on Wireless Communications vol. 2, No. 6, Nov. 2003.

Gautam Kulkarni, Sachin Adlakha and Mani Srivastava; "Subcarrier Allocation and Bit Loading Algorithms for OFDMA-Based Wireless Networks"; pp. 652-662; IEEE Transactions on Mobile Computing, vol. 4, No. 6, Nov./Dec. 2005.

* cited by examiner

*Primary Examiner*—Duc Nguyen
*Assistant Examiner*—Ayodeji Ayotunde
(74) *Attorney, Agent, or Firm*—The Farrell Law Firm, LLP

(57) ABSTRACT

A power controlling device in a mobile communication system, and a method thereof. A base station calculates an average interference of N previous frames, and broadcasts the average interference to subscriber stations. The subscriber stations determine transmission power based on the average interference. Noise and Interference (NI) of frames within a section corresponding to a setting size is calculated (the frames may include a current frame) so an estimated interference is close to the interference generated in the frame in which the subscriber station actually transmits a signal. In addition, to more precisely estimate the NI, the NI of the current frame is compensated according to a value and is broadcast.

8 Claims, 6 Drawing Sheets

POWER CONTROL METHOD FOR UPLINK IN MOBILE COMMUNICATION AND APPARATUS THEREOF

PRIORITY

This application claims priority under 35 U.S.C. §119 to Korean Patent Application No. 10-2006-0003972 filed in the Korean Intellectual Property Office on Jan. 13, 2006, the contents of which are incorporated herein by reference.

BACKGROUND OF THE INVENTION

1. Field of the Invention

The present invention generally relates to a power controlling method, and more particularly, to a device for performing an uplink power control operation in a mobile communication system and a method thereof.

2. Description of the Related Art

In a radio channel used in a mobile communication system, attenuation of a propagation path greatly varies according to distance and shadowing, and a Carrier to Noise and Interference (C/I) ratio greatly varies according to a channel state since the radio channel has large inter-cell interference and fading. In an Orthogonal Frequency Division Multiplexing Access (OFDMA)-based packet communication system, since a cell uses a subcarrier having a same index as that of a subcarrier of another cell, an Other-Cell Interference (OCI) occurs. Accordingly, the magnitude of Noise and Interference (NI) to a Subscriber Station (SS) varies according to an amount of OCIs.

In an OFDMA system, since power of a subscriber station in another cell acts as the OCI and the amount of interference that continuously varies greatly affects throughput of the entire system, it is important to control the power of the subscriber station to minimize the interference. Accordingly, an uplink power control operation considering the interference received from a neighboring cell is performed.

The uplink power control operation is performed while considering an average value of the NIs caused in a previous frame of each cell, an average Carrier to Noise and Interference ratio (C/N) value, and a user path attenuation value. Generally, a closed-loop power control operation or an open-loop power control operation is performed for the uplink power control operation, which is usually performed for one cell. Path attenuation, channel characteristic variation, channel estimation error, and power control delay time are compensated for the interference and signal of the subscriber stations in one base station.

In the open-loop power control operation, the NIs to the subscribe station in all slots of one downlink frame are estimated, an average value of the estimated NIs are calculated for each cell, and a current average NI is estimated for each cell. The estimated current average NI is transmitted to each subscriber station of a corresponding cell. Each subscriber station uses the transmitted average NI to calculate the CN value, estimates its own path loss value, and applies the respective values to an equation for the open-loop power control to determine the power to be used in a subsequent frame. Subsequently, the subscriber station transmits a signal according to the power determined in the subsequent frame. The above process is repeatedly performed for each frame to perform the power control operation.

The average NI generated in a previous frame of the frame transmitting the signal is used to determine the power. Since the average NI of the previous frame varies according to packet generation and a hitting state of the subsequent frame, the power control based on the average NI of the previous frame is inaccurate.

In another power control method according to time, the power control is performed in each frame for each subscriber station. For example, the average NI of a $(i+3)^{th}$ frame is estimated, and the estimated NI is used to perform the open-loop power control at a starting point of a subsequent $(i+4)^{th}$ frame.

However, in the OFMDA system, the NI continuously varies as traffic of packets transmitted for each frame increases or decreases. Accordingly, a substantial error may occur between the NI estimated in the current frame and an actual NI generated in the subsequent frame.

Accordingly, as described above, since the average NI of the current frame is used to determine the power of the subsequent frame when the NI for the power control is estimated, an inaccurate NI is used, and a power control error may occur.

The above information is only for enhancement of understanding of the background of the invention and may contain information that does not form prior art that is already known in this country to a person of ordinary skill in the art.

SUMMARY OF THE INVENTION

The present invention provides a power controlling device for controlling uplink power based on precisely estimated noise and interference in a mobile communication system, and a power controlling method therefore.

According to one aspect of the present invention, in a power controlling method for controlling uplink power in a mobile communication system, a base station estimates noise and interference (NI) of a current frame based on signals received in the current frame, the base station averages the NIs of a plurality of frames including the current frame and corresponding to a section corresponding to a setting size to calculate an average NI, and the base station broadcasts the average NI to subscriber stations in a corresponding cell. The subscriber stations determine transmission power for transmitting a signal to an uplink based on the average NI. The plurality of frames corresponding to the setting size include the current frame and at least one previous frame.

According to another aspect of the present invention, in a power controlling method for controlling uplink power in a mobile communication system, a base station estimates NI of a current frame based on signals received in the current frame and sets the estimated NI as a first average NI, the base station averages the NIs of previous frames corresponding to a setting size (the previous frames do not include the current frame) and calculates a second average NI, and the base station broadcasts the compensated first average NI to subscriber stations in a corresponding cell. The subscriber stations determine transmission power for transmitting a signal to an uplink based on the broadcasted first average NI.

According to still another aspect of the present invention, in a power controlling method for controlling uplink power in a mobile communication system, a base station estimates average NI of a current frame based on signals received in the current frame and sets the estimated average NI as a first average NI, the base station averages NIs of previous frames within a section corresponding to a setting size (the previous frames do not include the current frame) and calculates a second average NI, the base station compares the first average NI and the second average NI, the base station increases the first average NI to compensate the first average NI when the first average NI is less than the second average NI, the base station broadcasts the compensated first average NI to subscriber stations in a corresponding cell, and the base station broadcasts the first average NI without compensating the first average NI to the subscriber stations in the corresponding cell. The subscriber stations determine transmission power for transmitting a signal to an uplink based on the broadcasted first average NI.

According to yet another aspect of the present invention, in a power controlling device for broadcasting a signal for determining uplink transmission power to subscriber stations in a mobile communication system (the uplink transmission power is determined by the subscriber station) includes a receiving unit, a storage unit, an NI estimating unit, and a transmitting unit. The receiving unit processes a received signal. The storage unit stores NI measured in a previous frame. The NI estimating unit estimates the NI of a current frame based on signals received in the current frame through the receiving unit. The transmitting unit transmits a signal. The NI estimating unit averages the NIs of a plurality of frames within a section corresponding to a setting size (the plurality of frames includes the current frame), calculates an average NI, and broadcasts the average NI through the transmitting unit.

According to still another aspect of the present invention, in a power controlling device for broadcasting a signal for determining uplink transmission power to subscriber stations in a mobile communication system (here, the uplink transmission power is determined by the subscriber station) includes a receiving unit, a storage unit, an NI estimating unit, an NI compensating unit, and a transmitting unit. The receiving unit processes a received signal. The storage unit stores NI measured in a previous frame. The NI estimating unit estimates a first average NI of a current frame based on signals received through the receiving unit in the current frame, averages the NIs of previous frames within a section corresponding to a setting size (the previous frames do not include the current frame) and estimates a second average NI. The NI compensating unit compares the first average NI and the second average NI, and compensates the first average NI according to a comparison result. The transmitting unit broadcasts a signal including the first average NI output from the NI compensating unit.

The NI compensating unit increases the first average NI to compensate the first average NI when the first average NI is less than the second average NI, and it decreases the first average NI to compensate the first average NI when the first average NI is greater than the second average NI.

In addition, the NI compensating unit outputs the first average NI without compensating it when the first average NI is greater than the second average NI.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
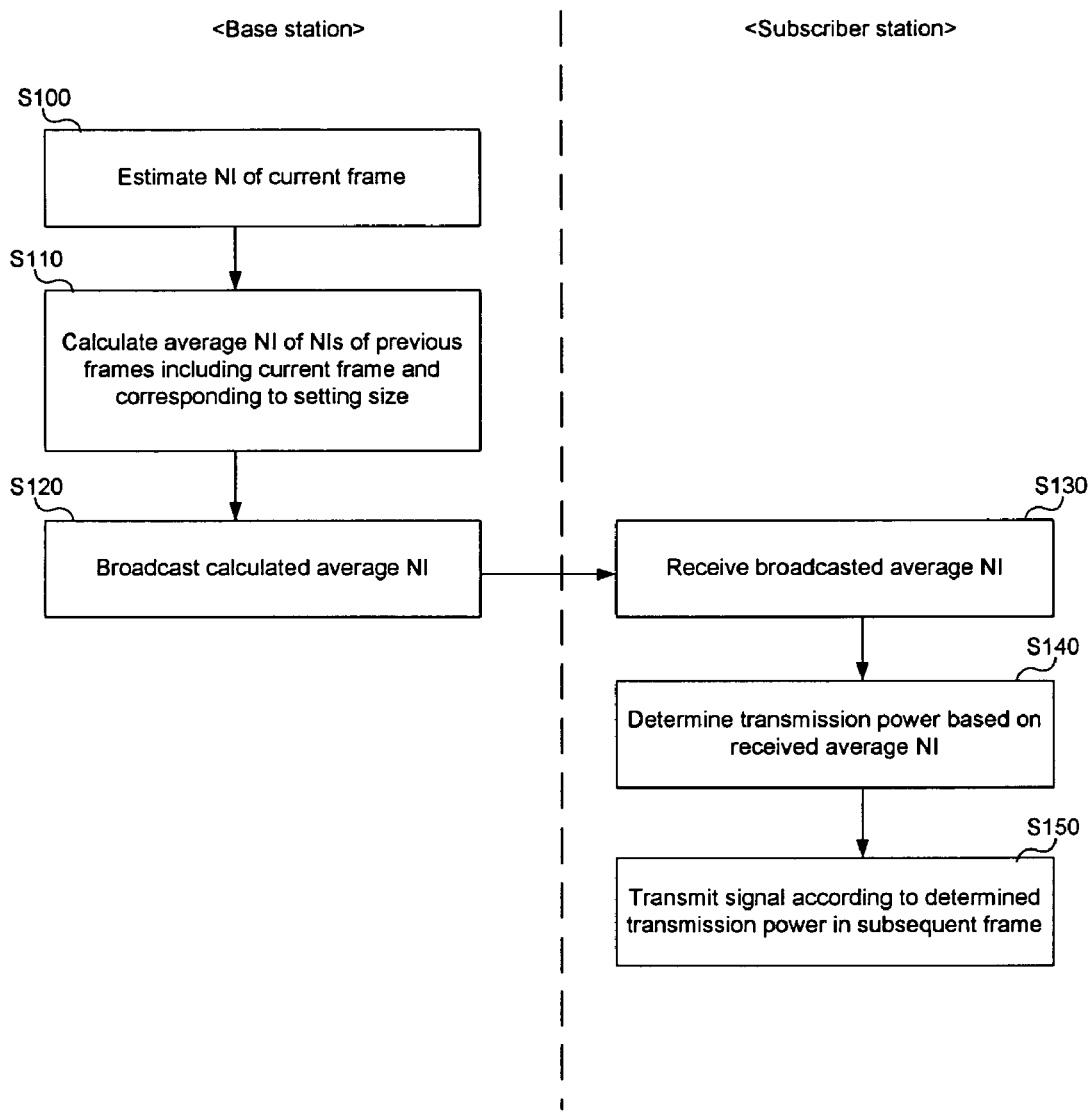
FIG. 1 shows a flowchart representing an uplink power control method according to a first embodiment of the present invention.

In the following detailed description, only certain preferred embodiments of the present invention will be shown and described. As those skilled in the art would realize, the described embodiments may be modified in various different ways, all without departing from the spirit or scope of the present invention. Accordingly, the drawings and description are to be regarded as illustrative in nature and not restrictive.

In addition, unless explicitly described to the contrary, the word "comprise" and variations such as "comprises" or "comprising" will be understood to imply the inclusion of stated elements but not the exclusion of any other elements. In addition, the word "unit" will be understood to indicate a unit for processing a function or operation, which may be realized by hardware, software, or a combination thereof.

Words used in the present invention will be described. Noise and Interference (NI) denotes an amount of noise and interference to a subscriber. Particularly, in an Orthogonal Frequency Division Multiplexing Access (OFDMA) system, the NI is not generated between subscriber stations in the same cell. The NI is generated by signal power of another subscriber station in another cell having the same carrier.

An uplink power control method according to the present invention and a device for performing the uplink power control method will be described with reference to the figures. An OFDMA using a multi-carrier will be described as a mobile communication system below, but the present invention is not limited thereto.

In an OFDMA system, a power control value for an uplink feedback channel is used to control transmission power for transmitting an uplink traffic burst, and a dispersing method in which each subscriber station determines a power control value to additionally control the transmission power while considering other cell interference is used. A feedback channel is used to report an uplink channel quality, a bandwidth request, band selection, and a beam index for performing beam forming, and a base station measures Carrier to Noise and Interference (C/N) ratio based on a signal received through the feedback channel and broadcasts a power control value for satisfying a required C/N to each subscriber station through a downlink control channel. Each subscriber station controls the transmission power for the feedback channel according to the power control value received through the downlink channel. A control-data power offset is added to the transmission power of the feedback channel to establish the transmission power of a traffic burst to be transmitted in an uplink.

In the present invention, an average interference of interferences of N previous frames is estimated, and a power control operation for each frame is performed based on the estimated average interference. In further detail, the base station estimates the average interference of a plurality of frames in a section corresponding to a setting size based on the signals received through a channel (e.g., the uplink channel), and broadcasts the estimated average interference as a power control value to each subscriber station through the downlink control channel, so the NI used to control the power may be close to the NI generated in the frame in which the signal is actually transmitted. The frames in the section corresponding to the setting size include a current frame and at least one previous frame, or they include at least one previous frame excluding the current frame.

When considering the NI in one frame, a large error with the NI of the frame in which the signal is actually transmitted may occur in the OFDMA system in which the frame frequently varies. However, in the present invention, since the power control operation is performed while considering the average NI of the plurality of frames, the average NI used to control the power is close to the actual NI, and the power control may be more precisely performed.

In the present invention, the size of a sliding window is used as the setting size. In a sliding window method for transmitting a plurality of frames, buffers for n frames are allocated to a receiving terminal, and a transmitting terminal does not wait for an acknowledgement ACK from the receiving terminal and transmits the n frames. A size of the sliding window indicates the number of frames that are transmitted at a time. In the present invention, the size of the sliding window is the setting size, but the present invention is not limited thereto.

Figure 2:
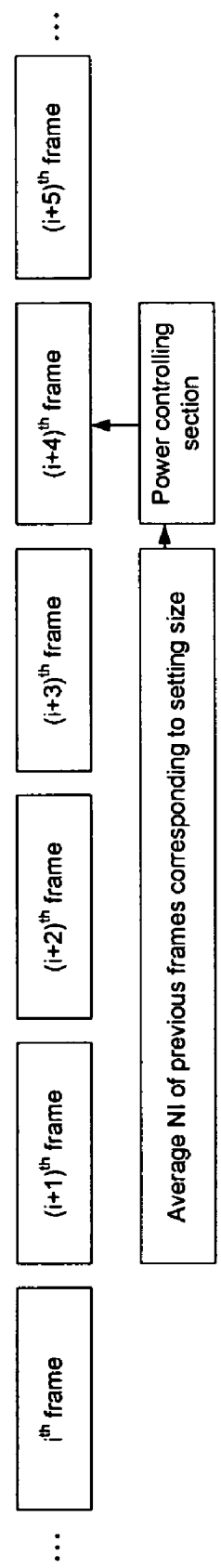
FIG. 2 shows a diagram representing an example of the uplink power control method shown in FIG. 1.

FIG. 1 shows an uplink power control method example according to the present invention, and FIG. 2 shows a diagram representing an example of the uplink power control method shown in FIG. 1.

As shown in FIG. 1, while including a current frame, an average NI of frames that correspond to a size of sliding window is calculated. For example, when the current frame is an $(i+3)^{th}$ frame and the size of the sliding window is "3 frames", as shown in FIG. 2, the average NI of three frames including the current $(i+3)^{th}$ frame (i.e., the $(i+3)^{th}$ frame, an $(i+2)^{th}$ frame, and an $(i+1)^{th}$ frame) is calculated.

Accordingly, in each frame, an interference and noise value affecting the subscriber station (i.e., the NI) is estimated based on signals received at each slot from the respective subscriber stations. Methods for estimating the NI may include a method for directly estimating the NI by using data and a method for estimating the NI by using a preamble. For example, differences between neighboring subcarriers are calculated from signals received from the respective subscriber stations, and the calculated differences are averaged to estimate the NI.

As described above, the NIs of the respective frames are estimated, the estimated NIs are averaged, and the average NI (i.e., the average NI of the previous frames (e.g., $(i+3)^{th}$, $(i+2)^{th}$, and $(i+1)^{th}$ frames in FIG. 2) corresponding to the setting size) according to the present invention may be calculated in steps S100 to S110.

Then, the base station broadcasts the estimated average NI to the subscriber station of the corresponding cell in step S120. Since the NIs of the previous frames corresponding to the size of a sliding window are used to obtain the broadcasted average NI, the NI is further close to that of the frame in which the signal is actually transmitted.

The respective subscriber stations receive the broadcasted average NI to perform the power control operation. In further detail, the C/N is calculated based on the average NI, a path loss value is estimated, and transmission power is determined as Equation (1) in steps S130 and S140.

$$p(dBm) = L + (C/N)_{nor} - 10 \log_{10}(R) + \text{Offset\_SS}_{perSS} + \text{Offset\_BS}_{perSS} \quad (1)$$

P denotes transmission power for each subcarrier, L denotes currently uplink transmission loss including a forward path loss, an uplink propagation loss, transmission(Tx)/Reception(Rx) antenna gain, and a path loss, $(C/N)_{nor}$ denotes a Signal to Noise Ratio (SNR) for providing a required modulation/channel encoding rate, R denotes the number of repetitions set for the modulation/channel encoding rate, NI denotes an estimated average power level of noise and interference, $\text{Offset\_SS}_{perSS}$ denotes a subscriber power offset controller by the subscriber station, and $\text{Offset\_BS}_{perSS}$ denotes a base station power offset controlled by the base station.

Based on Equation (1) for the open-loop power control, the forward loss value is estimated and compensated, and when noise and interference exist, power compensation (i.e., power increase) by a value corresponding to the noise and interference is performed. In addition, power compensation (i.e., a power increase) for satisfying the SNR for providing the modulation/channel encoding rate is performed. When repetition is set, transmission power is determined so power is reduced by a level corresponding to the number of repetitions. This open-loop power control method has been disclosed in the prior art, and therefore detailed descriptions thereof will be omitted.

When transmission power is determined as described above, the subscriber station transmits a signal according to the transmission power determined in the subsequent frame (e.g., an $(i+4)^{th}$ frame in FIG. 2) in step S150.

The above steps are performed for each frame, and the uplink power control is performed.

Another example of an uplink power control method according to the present invention will be described.

When the estimated average NI of a plurality of frames is large, respective subscriber stations increase power to compensate interferences for the estimated average NI and they transmit a signal, and the signal may affect the user in another cell as a large interference corresponding to the increased power. In addition, when the estimated average NI is less, the respective subscriber stations decrease the power to compensate the interferences for the estimated average NI, and they transmit the signal. When the actual NI of the frame in which the signal is transmitted is great, a power control error may occur. The estimated average NI may affect performance of the respective subscribe stations.

Accordingly, since the NI is estimated by using the plurality of frames corresponding to the setting size to use the NI close to the actual NI and is appropriately compensated and broadcasted, an optimum power control operation may be performed. That is, in a manner similar to FIG. 1, the average NI of the frames corresponding to the setting size is estimated, and the NI of a current frame is compensated based on the average NI and is broadcasted in this example of the present invention.

Figure 3:
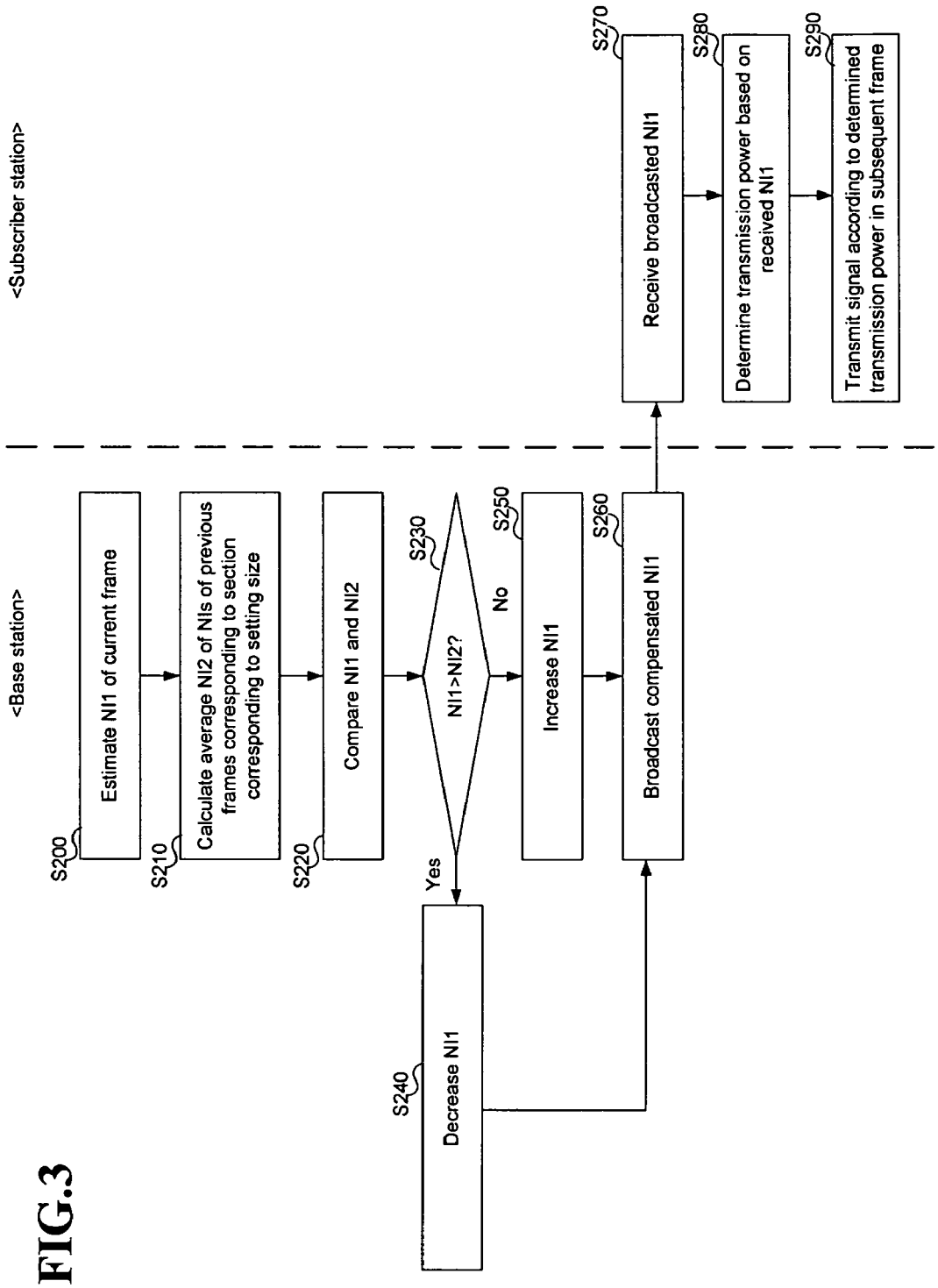
FIG. 3 shows a flowchart representing an uplink power control method according to a second embodiment of the present invention.
Figure 4:
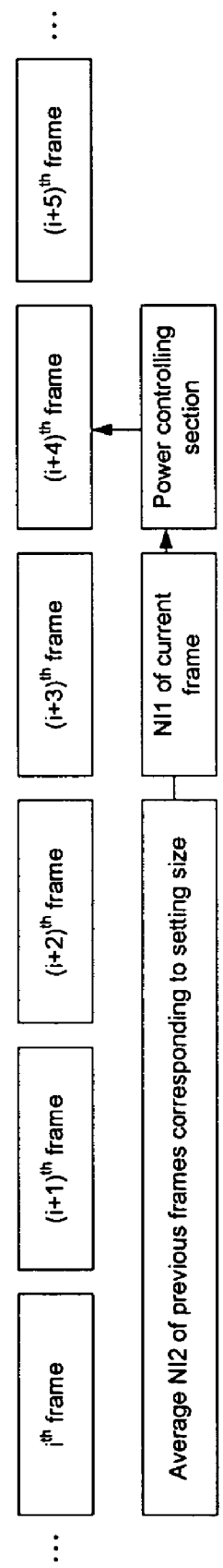
FIG. 4 shows a diagram representing an example of the uplink power control method shown in FIG. 3.

FIG. 3 shows an uplink power control method according to this example of the present invention, and FIG. 4 shows a diagram representing an example of the uplink power control method shown in FIG. 3.

As shown in FIG. 3, the base station respectively estimates the NI of the current frame and the average NI of the previous frames within a section corresponding to the setting size (i.e., the size of sliding window) in steps S200 to S210. For example, when the current frame is the $(i+3)^{th}$ frame and the size of sliding window is "3 frames", as shown in FIG. 4, the NI of the current $(i+3)^{th}$ frame is estimated, and the average NI of three previous frames (i.e., the $(i+2)^{th}$, $(i+1)^{th}$, and $i^{th}$ frames) is calculated. Hereinafter, for better comprehension and ease of description, the NI of the current frame will be referred to as a first average NI NI1, and the average NI of the previous frames of the section corresponding to the setting size will be referred to as a second average NI NI2.

The first and second average NIs NI1 and NI2 are respectively calculated, and the transmission power control is performed according to a relationship between the first and second average NIs NI1 and NI2.

For this purpose, the base station compares the first and second average NIs NI1 and NI2 in step S220, and a compensation value is generated according to a comparison result.

In further detail, when the first average NI NI1 corresponding to the current frame is greater than the second average NI NI2 of the previous frames corresponding to the setting size, a compensation value for decreasing the transmission power of the subscriber station in a ratio is set in steps S230 and S240. In addition, when the first average NI NI1 is less than the second average NI NI2 of the previous frames corresponding to the setting size, the compensation value for increasing the transmission power of the subscriber station in the ratio is set in step S250.

After increasing or decreasing the first average NI NI1 of the current frame to compensate the first average NI NI1 according to the comparison result, the base station broadcasts the compensated first average NI NI1 to the respective subscriber stations in step S260.

Subsequently, the respective subscriber stations determine the transmission power based on the received first average NI NI1 in a manner similar to FIG. 1, and transmit a signal in a subsequent frame (e.g., an $(i+4)^{th}$ frame in FIG. 4) according to the determined transmission power in steps S270 to S290.

Another uplink power control method example according to the present invention will be described.

In this example, the first average NI NI1 is compensated according to the comparison result between the first average NI NI1 corresponding to the current frame and the second average NI NI2 of the previous frames within the section corresponding to the setting size to perform the power control. However, differing from the uplink power control method shown in FIG. 3, the first average NI NI1 is selectively compensated in the uplink power control method shown in FIG. 5.

Figure 5:
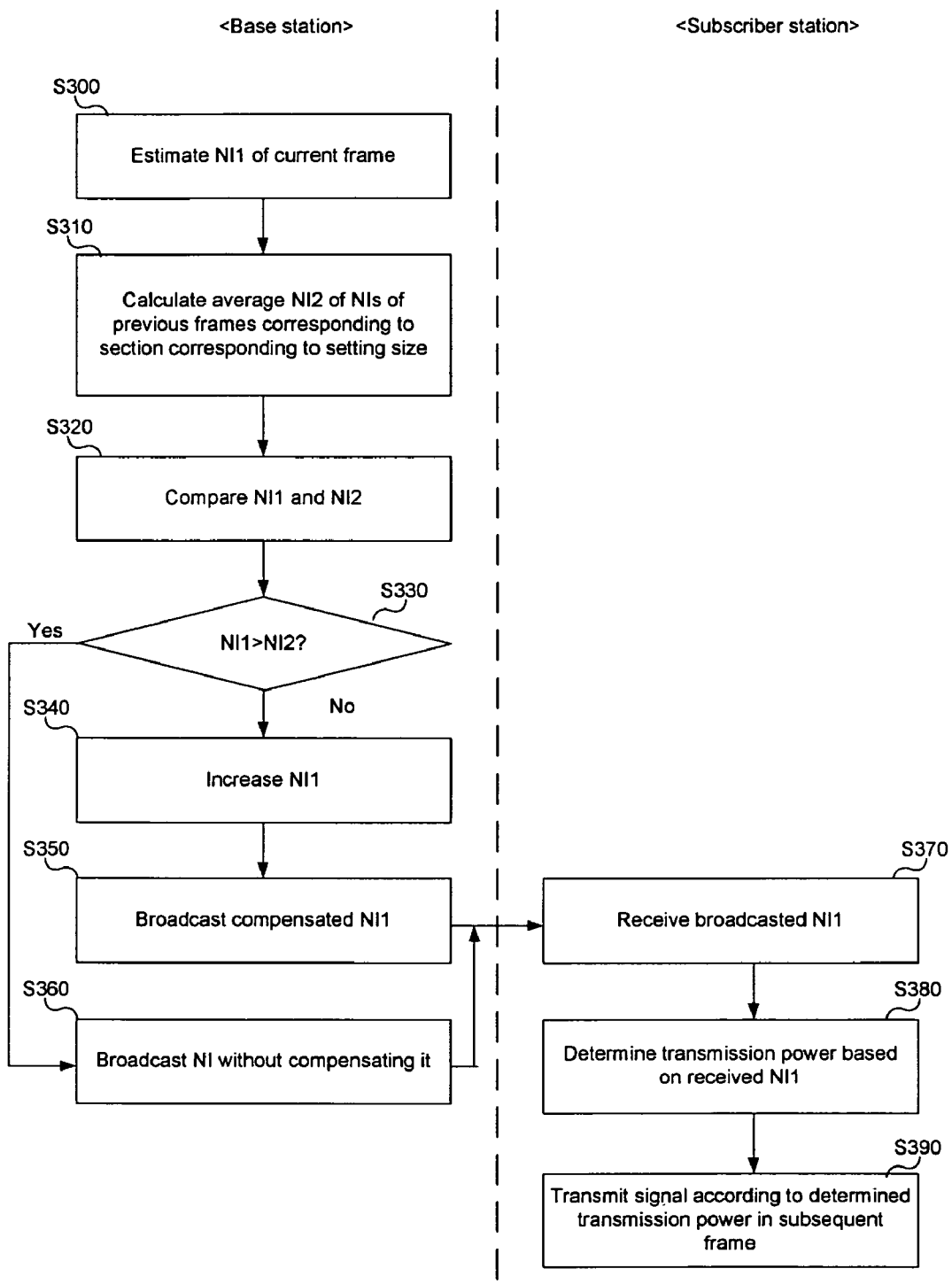
FIG. 5 shows a flowchart representing the uplink power control method according to a third embodiment of the present invention.

As shown in FIG. 5, in a manner similar to the uplink power control method shown in FIG. 3, the base station respectively calculates the first and second average NIs NI1 and NI2 in steps S300 to S310, the first average NI NI1 and the second average NI NI2 are compared in step S320, and the first average NI NI1 is compensated according to the comparison result.

In further detail, when the first average NI NI1 corresponding to the current frame is less than the second average NI NI2 of the previous frames corresponding to the setting size, the compensation value for increasing the transmission power of the subscriber station in a ratio is set, and the first average NI NI1 of the current frame is increased according to the set compensation value in steps S330 to S340. In addition, the compensated first average NI NI1 is broadcast to the subscriber stations in the corresponding cell in step S350.

Further, when the first average NI NI1 corresponding to the current frame is greater than the second average NI NI2 of the previous frames corresponding to the setting size, the first average NI NI1 is not compensated. Accordingly, the first average NI NI1 calculated in step S300 is broadcasted to the subscriber stations in the corresponding cell in step S360.

As described above, in the uplink power control method shown in FIG. 5, when the first average NI NI1 is less than the second average NI NI2, to prevent the signal receiving performance from being decreased by the interference increased when the transmission power decreases, the first average NI NI1 is increased to compensate the first average NI NI1. Therefore, the transmission power of the subscriber station may be increased.

However, when the transmission power is increased, an Other-Cell Interference (OCI) may increase, but the signal receiving performance of the corresponding terminal increases, and therefore the first average NI NI1 is not compensated in the uplink power control method shown in FIG. 5 when the first average NI NI1 is less than the second average NI NI2.

Subsequently, the respective subscriber stations determine the transmission power based on the received first average NI NI1 in a in a manner similar to the uplink power control method shown in FIG. 1, and transmit the signal in the subsequent frame (e.g., the $(i+4)^{th}$ frame in FIG. 4) according to the determined transmission power in steps S370 to S390.

According to the uplink power control methods shown in FIGS. 3 and 5, when the NI for each frame greatly varies, since the NI of the current frame is compensated according to the comparison result between the NI of the current frame and the NU of the previous frames and the compensated NI is broadcasted, the power control according to the NI close to the actual NI of the frame in which the signal is actually transmitted may be performed.

Figure 6:
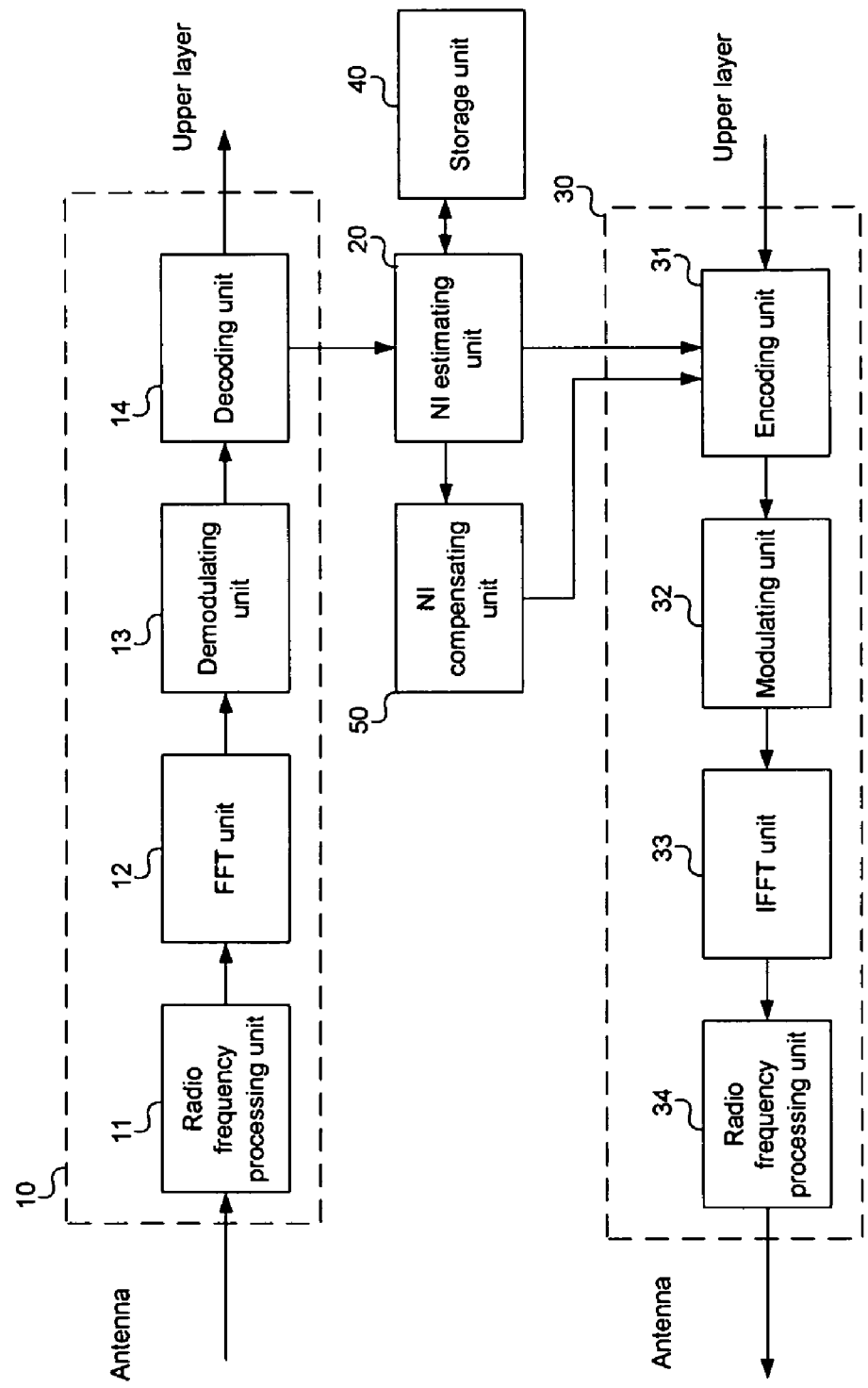
FIG. 6 shows a diagram of a configuration of a power controlling device according to the present invention.

FIG. 6 shows a power controlling device according to the present invention. The drawings and description are to be regarded as illustrative in nature and not restrictive.

As shown in FIG. 6, the power controlling device according to the present invention includes a receiving unit 10 for processing a signal received through an antenna, an NI estimating unit 20 for estimating the NI for the power control based on the received signals, and a transmitting unit 30 for broadcasting a signal including the estimated NI through the antenna. In addition, the power controlling device may further include a storage unit 40 for storing the NIs of the previous frames, and an NI compensating unit 50 for compensating the estimated NI.

The receiving unit 10 includes a wireless frequency processing unit 11 for converting the received signal to a low frequency bandwidth, a Fast Fourier Transform (FFT) unit 12 for performing an FFT operation for the received signal, a demodulating unit 13 for demodulating the fast Fourier transformed signal, and a decoding unit 14 for decoding the demodulated signal and outputting the decoded signal.

The transmitting unit 30 includes an encoding unit 31 for encoding a signal including data to be transmitted, a modulating unit 32 for modulating the encoded signal, an Inverse Fast Fourier Transform (IFFT) unit 33 for performing an IFFT operation for the modulated signal, and a radio frequency processing unit 34 for converting the inverse fast Fourier transformed signal to a radio frequency bandwidth. The receiving unit 10 and the transmitting unit 30 according to the present invention are not limited to the above configuration.

The NI estimating unit 20 according to the present invention calculates the average NIs of the current frame and the previous frames within the section corresponding to the setting size based on the signals received through the receiving unit 10 by using the method shown in FIG. 1. That is, the NIs of the previous frames that are stored in the storage unit 40 and the NIs of the current frames are averaged, and the average NI of the frames corresponding to the setting size is calculated.

The calculated average NI is broadcasted to the respective subscriber stations through the transmitting unit 30.

In addition, by using the uplink power control methods shown in FIGS. 3 and 5, the NI estimating unit 20 respectively calculates the NI of the current frame (i.e., the first average NI) and the average NI of the previous frames within the section corresponding to the setting size (i.e., the second average NI) based on the received signals and the NIs stored in the storage unit 40.

In the uplink power control methods shown in FIGS. 3 and 5, the NI compensating unit 50 compares the first average NI NI1 and the second average NI NI2, and selectively compensates the first average NI according to the comparison result. The selectively compensated first average NI is broadcasted to the respective subscriber stations through the transmitting unit 30.

The above-described methods and apparatuses are not only realized by the preferred embodiments of the present invention, but, on the contrary, are intended to be realized by a program for realizing functions corresponding to the preferred embodiments of the present invention or a recording medium for recording the program.

While this invention has been described in connection with preferred embodiments, it is to be understood that the invention is not limited to the disclosed embodiments, but, on the contrary, is intended to cover various modifications and equivalent arrangements included within the spirit and scope of the appended claims.

According to the present invention, advantageous effects may be obtained as follows.

In a mobile communication system, since NIs of signals received from subscriber stations may be further precisely estimated, optimum power control may be performed. Particularly, in an OFDMA system in which interference is generated by the another cell using the same carrier, since the NI of a plurality of frames that include or do not include a current frame within a section corresponding to an estimated setting size, the subscriber station may determine the transmission power based on the precise NI close to the interference generated in the frame in which the signal is actually transmitted.

Since transmission power is determined based on a precise NI, OCI is reduced, and throughput of the entire mobile communication system may be increased.

What is claimed is:

1. A power controlling method for controlling uplink power in a mobile communication system, the power controlling method comprising:

estimating, by a base station, average Noise and Interference (NI) of a current frame based on signals received in the current frame, and setting the estimated average NI as a first average NI;

averaging, by the base station, NIs of previous frames within a section corresponding to a setting size, the previous frames excluding the current frame, and calculating a second average NI;

comparing, by the base station, the first average NI and the second average NI;

increasing, by the base station, the first average NI to compensate the first average NI when the first average NI is less than the second average NI;

broadcasting, by the base station, the compensated first average NI to subscriber stations in a corresponding cell; and broadcasting, by the base station, the first average NI without compensating the first average NI to the subscriber stations in the corresponding cell when the first average NI is greater than the second average NI, wherein the subscriber stations determine transmission power for transmitting a signal to an uplink based on the broadcasted first average NI.

2. The power controlling method of claim 1, wherein the setting size is the size of a sliding window.

3. The power controlling method of claim 1, wherein the power controlling method is performed for each frame.

4. The power controlling method of claim 1, wherein the subscriber stations apply the received average NI to an open-loop power controlling method to determine the transmission power.

5. A power controlling device for broadcasting a signal for determining uplink transmission power to subscriber stations in a mobile communication system, the uplink transmission power determined by the subscriber station, the power controlling device comprising:

a receiving unit for processing a received signal;

a storage unit for storing Noise and Interference (NI) measured in a previous frame;

an NI estimating unit for estimating a first average NI of a current frame based on signals received through the receiving unit in the current frame, averaging the NIs of previous frames within a section corresponding to a setting size, the previous frames excluding the current frame, and estimating a second average NI;

an NI compensating unit for comparing the first average NI and the second average NI, and compensating the first average NI according to a comparison result; and a transmitting unit for broadcasting a signal including the first average NI output from the NI compensating unit, wherein the NI compensating unit outputs the first average NI without compensating the first average NI when the first average NI is greater than the second average NI.

6. The power controlling device of claim 5, wherein the NI compensating unit increases the first average NI to compensate the first average NI when the first average NI is less than the second average NI.

7. The power controlling device of claim 5, wherein the setting size is the size of a sliding window.

8. The power controlling device of claim 5, wherein the mobile communication system is an Orthogonal Frequency Division Multiple Access system.

* * * * *